United States Patent
Chen

(10) Patent No.: US 6,926,767 B2
(45) Date of Patent: Aug. 9, 2005

(54) AQUEOUS DISPERSIONS OF NUCLEATING AGENTS

(75) Inventor: Bing-Lin Chen, Germantown, TN (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 533 days.

(21) Appl. No.: 09/989,038

(22) Filed: Nov. 21, 2001

(65) Prior Publication Data

US 2003/0092821 A1 May 15, 2003

Related U.S. Application Data

(60) Provisional application No. 60/250,920, filed on Dec. 1, 2000.

(51) Int. Cl.$^7$ ............................................. C09D 191/00
(52) U.S. Cl. ............. 106/243; 106/287.24; 106/287.35; 524/1; 524/81; 524/300; 524/321; 524/322; 524/320; 524/340; 524/376; 524/847
(58) Field of Search ........................... 106/243, 287.24, 106/287.35; 524/1, 81, 300, 320, 321, 322, 340, 376, 847

(56) References Cited

U.S. PATENT DOCUMENTS

| | | | | |
|---|---|---|---|---|
| 3,368,995 A | * | 2/1968 | Furukawa et al. | 524/381 |
| 3,997,306 A | * | 12/1976 | Hedden | 65/448 |
| 4,276,208 A | * | 6/1981 | Ogawa et al. | 523/217 |
| 4,394,418 A | * | 7/1983 | Temple | 428/391 |
| 4,425,457 A | * | 1/1984 | Christiansen et al. | 524/293 |
| 4,659,753 A | * | 4/1987 | Tiburtius et al. | 523/209 |
| 4,737,523 A | * | 4/1988 | White et al. | 521/91 |
| 5,900,454 A | * | 5/1999 | Kirchmeyer et al. | 524/522 |
| 6,833,182 B2 | * | 12/2004 | Audenaert et al. | 428/297.4 |

\* cited by examiner

*Primary Examiner*—David Brunsman
(74) *Attorney, Agent, or Firm*—Michael P. Dilworth

(57) ABSTRACT

A storage stable aqueous dispersion useful in preparing sizing compositions for glass fibers contains a normally solid nucleating agent, a nonionic surfactant, and a base. The nucleating agent is a mixture of an aliphatic monocarboxylic acid and an aliphatic dicarboxylic acid. Also disclosed are the process of making the dispersion, and the use of the sized glass fibers in glass fiber reinforced polyolefin composites having improved mechanical properties such as tensile strength, flexural strength, and notched and unnotched IZOD.

15 Claims, No Drawings

AQUEOUS DISPERSIONS OF NUCLEATING AGENTS

CROSS-REFERENCE TO RELATED APPLICATION

This application claims priority to U.S. Provisional Application No. 60/250,920, filed Dec. 1, 2000.

FIELD OF THE INVENTION

This invention relates to aqueous dispersions of nucleating agents useful in the preparation of sizing compositions for coating glass fibers which in turn are useful in the preparation of glass fiber reinforced polyolefin composites. It further relates to storage stable aqueous dispersions of normally solid nucleating agents which are pumpable and miscible in aqueous systems so as to make them useful as additives in glass fiber sizing compositions. An important aspect of this invention is the use of aqueous dispersions comprising an aliphatic monocarboxylic acid and an aliphatic dicarboxylic acid in glass fibers to provide the improved mechanical properties of polyolefins reinforced by the sized glass fibers.

BACKGROUND OF THE INVENTION

Olefin homopolymers and copolymers (i.e. polyolefins) have become commercially important for the manufacture of various merchandise. Polyolefins however are often undesirably translucent due to the crystal structure of the polymer. Nucleating agents which enhance nucleation during solidification of molten polymer are thus widely used in polyolefin compositions and particularly polypropylene to improve the clarity, physical properties and value of the polyolefins. Nucleating agents are usually available as solids at room temperature. U.S. Pat. Nos. 3,207,735 and 3,207,738 disclose the use of benzoic acid and aryl alkanoic acid type compounds to improve the properties of polypropylene. The combination of benzoic acid and adipic acid, carboxylic acids and ethoxylated amines, or aliphatic monocarboxylic acid and aliphatic dicarboxylic acid, as nucleating agents for polyolefins are described in U.S. Pat. Nos. 4,704,421, 4,829,114, 5,300,549, 5,319,012 and 5,491,187.

Polyolefins have also become commercially important in the manufacture of polyolefin composites, such as polyethylene and polypropylene composites, for various applications. Composite properties are often improved considerably due to the use of fillers such as glass fibers in polyolefins. In order to assist the fibers to adhere to the polyolefin matrix and to protect fibers during processing, glass fibers are usually coated with an aqueous sizing composition. One way to help distribute the aforementioned solid nucleating agents evenly in polyolefins is to let the fillers carry and deliver the nucleating agents throughout the polyolefin matrix.

Glass fibers intended for incorporation as reinforcing elements in articles fabricated from various resinous materials, such as polyolefins, are usually coated with sizing compositions to protect fibers from damage during processing and to enhance the interaction between the fibers and the polymeric matrix. Such sizing compositions typically contain a film forming polymer, a lubricant, a coupling agent, and other ingredients known to those skilled in the art, all dispersed or dissolved in an aqueous medium. The film forming polymer is usually compatible with the matrix resin in which the glass fibers are embedded as reinforcement. A broad range of oils, waxes, etc., have been used as lubricants. Among the widely used coupling agents are organosilanes (e.g. Silquest® A1001, an aminosilane from Crompton Corporation).

Other components such as antifoam agents, pH regulators, surfactants, and UV stabilizers are also frequently included in such sizing compositions. Various aqueous sizing compositions for glass fibers have been reported in U.S. Pat. Nos. 4,394,414, 4,448,911, 4,656,084, 5,130,197 and 5,646,207. The aforementioned normally solid nucleating agents when coated on glass fibers are capable of enhancing nucleation in polyolefin matrices thereby improving the clarity and mechanical properties of the glass fiber reinforced polyolefin composites.

It is therefore highly desirable to provide nucleating agents in an aqueous form which is compatible and miscible with aqueous sizing compositions. The advantage of using an aqueous dispersion of nucleating agents of this invention in preparing sizing compositions to coat glass fibers with the resultant improvement in polyolefin composite properties of the glass fiber reinforced polyolefins have not heretofore been appreciated in the art.

It is an object of the present invention to provide stable and pumpable aqueous dispersions of normally solid nucleating agents.

Another object of the present invention is the process of making the aqueous dispersion of nucleating agents.

Also an object of the present invention is the method of using aqueous nucleating agent dispersion in aqueous sizing composition for glass fibers. Another object of the present invention is the method of using the sized glass fibers in polyolefin composites having improved mechanical properties. Other objects will become apparent from the ensuing description.

SUMMARY OF THE INVENTION

In accordance with this invention there is provided a storage stable aqueous dispersion comprising from about 15 to about 30 weight percent of a normally solid nucleating agent, an effective amount of surfactant, and up to about 10 weight percent of base. The aqueous dispersion of this invention can be used in sizing compositions to coat glass fibers which can in turn be incorporated into polyolefins to form polyolefin composites having improved mechanical properties. The normally solid nucleating agent is a mixture of at least one aliphatic monocarboxylic acid having 8 to 24 carbon atoms and at least one aliphatic dicarboxylic acid having 4 to 21 carbon atoms in a weight ratio between about 1:4 and about 4:1.

Also provided in accordance with this invention are glass fibers sized with a sizing composition containing the aforedescribed aqueous nucleating agent dispersion as well as plastic articles reinforced with the sized glass fibers.

DESCRIPTION OF THE PREFERRED EMBODIMENTS

Aqueous dispersions of the present invention comprise a normally solid (at 25° C.) nucleating agent which is a mixture of at least one aliphatic monocarboxylic acid having 8 to 24 carbon atoms and at least one aliphatic dicarboxylic acid having 4 to 21 carbon atoms in a weight ratio between about 1:4 and about 4:1. Examples of aliphatic monocarboxylic acids useful in this invention are lauric acid, myristic acid, palmitic acid, stearic acid, arachidic acid, behenic acid, oleic acid, erucic acid and mixtures thereof, which are usually derived from hydrolysis of the naturally-occurring fats and oils such as beef tallow, palm oil, soybean oil, and the like. Examples of aliphatic dicarboxylic acids useful in this invention are succinic acid, adipic acid, glutaric acid, suberic acid, sebacic acid, and dodecanedioic acid. Preferred nucleating agents of this invention are mixtures, preferably in a 1:1 ratio, of stearic acid and adipic acid, stearic acid and sebacic acid, and behenic acid and dodecanedioic acid, respectively.

The surfactants useful in this invention include nonionic surfactants such as ethoxylated alkyl phenols (e.g. ethoxylated nonylphenol), such as Witconol NP-100 (from Crompton Corporation) and Makon 10 (from Stepan Corporation); ethoxylated alkyl alcohols, such as Ethosperse LA-4 (ethoxylated lauryl alcohol having 4 ethylene oxide units, from Lonza Corporation), Iconol DA-6 and Iconol TDA-6 (ethoxylated decyl and tridecyl alcohols having 6 ethylene oxide units each from BASF Corporation), and ethoxylated fatty acids, such as Ninex MT-610 (from Stepan Corporation). The degree of ethoxylation in the nonionic surfactants typically ranges from about 2 to about 12, preferably 4 to 10, ethylene oxide units.

The base used in this invention may be selected from ammonium hydroxide, sodium hydroxide, potassium hydroxide, sodium carbonate, and the like.

Besides the foregoing components present in the aqueous dispersion of this invention, additional ingredients such as defoamer may also be used to control the foaming.

The aqueous dispersion can comprise from about 15 to about 30 percent by weight of the nucleating agent, from about 0.5 to about 15, preferably from about 1 to about 5 percent, by weight of surfactant, and from 0.5 to about 10, preferably from 0.5 to about 3, percent by weight of base.

The aqueous nucleating agent dispersion of this invention can be prepared as follows. Water and surfactant are placed into a vessel and mixed at 50–60° C. for about 10 minutes. Then the base is added. This is followed by the addition of a molten nucleating agent comprising at least one aliphatic monocarboxylic acid having 8 to 24 carbon atoms and at least one aliphatic dicarboxylic acid having 4 to 21 carbon atoms in a weight ratio between about 1:4 and about 4:1 (e.g. Moldpro 932 from Crompton Corporation) with vigorous mixing. Addition of the monocarboxylic acid and dicarboxylic acid can be performed simultaneously or sequentially in any order. The mixture is stirred at 50–60° C. for 30 minutes to 1 hour, and then cooled to room temperature to yield a flowable, milky dispersion which possess a total solid content of from about 15% to about 30% by weight and a pH in the range of about 5.0 to about 8.0.

It is known in the art that glass fibers for use in forming polyolefin composite articles are usually coated with a sizing composition to protect fibers from damage during processing and to enhance the bonding between glass fibers and polymeric matrix. The sizing composition used in the examples of this invention contain the following components: 2–5% maleated polypropylene, 2–5% aqueous nucleating agent dispersion of this invention, 0.2–1% polyurethane and 0.5–2% aminosilane coupling agent. The total solids content of the sizing composition will be from about 1 to about 25%, and preferably from about 3 to about 10% by weight.

The aqueous sizing composition can be applied to the glass fibers by drawing fibers over a roll, or other suitable surface flooded with the sizing composition, by spraying, or dipping, or by other suitable means. The overall concentration of the nonvolatile components in the sizing composition can be adjusted over a wide range according to the means of application to be used, the character of glass fibers to be sized, e.g. diameter and composition, and the weight of dried size coating on glass fiber desired. The sized glass fiber will usually have a loading of about 0.1 to about 5% by weight of dried size. The dried glass fibers are used to reinforce a wide variety of polymeric matrix, such as polyolefins, in any of the molding processes known to those skilled in the art utilizing either chopped strands, continuous strands, or mixtures thereof. Glass fibers sized with a sizing composition containing the aqueous nucleating agent dispersion of this invention can be incorporated into polypropylene resin, such as Montell PP6523, along with other desirable additives, to form polyolefin composite articles having improved composite properties, such as tensile strength, flexural strength, notched and unnotched IZOD.

In order to demonstrate the preparation and properties of the nucleating agent aqueous dispersions of this invention, the following experiments were performed.

EXAMPLE 1

Water (78 grams), Witconol NP-80 (10 grams) and Witconol NP-120 (5 grams) were placed into a beaker and heated to 55° C. with stirring for 10 minutes to form a surfactant solution. Ammonium hydroxide (2.2 grams) was added to the surfactant solution just before the addition of nucleating agent. A nucleating agent (Moldpro 932), i.e. a mixture of stearic acid (Hystrene 7018 from Crompton Corporation, 10 grams) and sebacic acid (10 grams), was melted in a separate beaker and poured into the surfactant solution agitated under a homogenizer (Virtishear Cyclone I.Q. mechanical homogenizer, by The Virtis Co. Gardiner, N.Y., 12525). The mixture was mixed under the homogenizer at 7,500 rpm for 20 minutes at 55° C., and then cooled to room temperature. The final product was a milky white flowable and stable dispersion having 30.4% nonvolatiles and pH of 6.0.

EXAMPLE 2

A second nucleating agent dispersion of this invention was prepared according to the procedure of Example 1 and the following formulation: water (700 grams), Witconol NP-100 (20 grams), ammonium hydroxide (18 grams), and a molten mixture of stearic acid (91 grams) and sebacic acid (91 grams) sold under the tradename Moldpro 932 (Crompton Corporation). The final product was a stable, flowable and milky dispersion having 20.2% nonvolatiles and a pH of 6.1.

EXAMPLES 3 AND 4

The third and fourth nucleating agent dispersions of this invention were made according to the procedure of Example 1 and the following formulations:

|  | Example 3 (grams) | Example 4 (grams) |
| --- | --- | --- |
| Water | 600 | 600 |
| Ethosperse LA-4 | 66 | — |
| Ninex MT-610 | — | 16 |
| BYK-024 Defoamer | 2 | 2 |
| Ammonium hydroxide | 14 | 14 |
| Hystrene 7018 | 80 | 80 |
| Sebacic acid | 80 | 80 |

The final nucleating agent dispersions had pH of 6.1 and nonvolatile contents of 22.0 and 21.7% for Example 3 and 4 respectively. BYK-024 Defoamer is from BYK Chemie USA.

EXAMPLES 5 and 6

The fifth and sixth nucleating agent dispersions of this invention were made according to the procedure of Example 1 and the following formulations:

|  | Example 5 (grams) | Example 6 (grams) |
|---|---|---|
| Water | 70 | 70 |
| Iconol DA-6 | 1.9 | — |
| Iconol TDA-6 | — | 2.0 |
| BYK-024 Defoamer | 0.4 | 0.4 |
| NH₄OH | 1.52 | 1.84 |
| Hystrene 7018 | 10 | 14 |
| Sebacic acid | 10 | 14 |

The final nucleating agent dispersions had pH of 6.0 and nonvolatile contents of 22.0 and 30.0% respectively.

EXAMPLE 7

Another nucleating agent dispersion of this invention was prepared using a batch attritor as follows. A premix slurry comprising water (150 grams), Witconol NP-100 (4 grams), ammonium hydroxide (3.3 grams), Hystrene 7018 (21 grams) and sebacic acid (21 grams) was placed in a Batch Attritor (model 01 Batch Attritor, from Union Process, Akron, Ohio, 44313) containing ⅜" stainless steel grinding media and milled for 1 hour. The resulting dispersion was separated from the grinding media by filtration through a filter funnel. The final product was flowable and stable having a pH of 6.2 and containing 21.1% nonvolatiles.

In order to demonstrate the usefulness of the dispersions of the invention in sizing glass fibers which are used as reinforcers in polyolefin composites, the following experiments were performed.

EXAMPLE 8 AND COMPARATIVE EXAMPLE 1

An aqueous sizing composition containing the nucleating agent dispersion of Example 2 was prepared according to the formulation set forth below (Example 8). Another sizing composition containing terephthalic acid as nucleating agent was also prepared for comparison as control (Comparative Example 1). Both sizing compositions were applied to glass fibers by conventional means during glass fiber manufacture to provide sized glass fibers for use as reinforcer in polypropylene composites. All of these sized glass fibers exhibited good handling and processing characteristics.

|  | (as wt % solid in sizing composition) | |
|---|---|---|
|  | Example 8 | Comparative Example 1 |
| Maleated polyproylene MW 30,000 | 4.0 | 2.48 |
| Terephthalic acid | — | 2.26 |
| Moldpro 932 | 1.0 | — |
| Polyurethane | 0.5 | 0.58 |
| Silquest A1100 | 0.7 | 0.85 |
| Water | balance | balance |

The glass fibers sized with sizing composition containing nucleating agent dispersion of this invention are used to prepare polypropylene composites as follows. A dry blend was prepared by mixing 30% sized glass fibers, 65% Montell PP6523 polypropylene, and 5% Uniroyal Polybond 3002. The blend was mixed in Littleford Blender and compounded in a HPM, 2.5 inch single screw extruder. The compounded resin was then molded in a Cincinnati Milacron, 150 ton, 8 oz injection molding machine to give molded articles which were tested for composite properties. Tensile strength, flexural strength, notched and unnotched IZOD properties of the molded articles were obtained according to ASTM methods D638, D790, D256 and D256, respectively. The results were as follows:

|  | Tensile Strength psi | Flexural Strength psi | IZOD notched ft-lb/in | IZOD unnotched ft-lb/in |
|---|---|---|---|---|
| Example 8 | 12,233 | 18,306 | 2.20 | 13.02 |
| Comparative Example 1 | 11,777 | 17,685 | 2.08 | 11.95 |

As the above data show, Example 8 containing the nucleating agent dispersion of this invention provides a means for producing glass fiber reinforced polypropylene articles having significantly improved composite properties over Comparative Example 1 containing terephthalic acid.

EXAMPLE 9

Sizing compositions containing varying levels (0%, 2.5%, 4%) of the nucleating agent dispersion of Example 2 were prepared according to the following formulation: 3.5–5% maleated polypropylene, 0–4% Example 2, 0–0.06% lubricant and 0.75-1% aminosilane. The sizing compositions were used to coat glass fibers which were then tested in polypropylene composites with results shown below.

| Composite properties | Example 2 dispersion in sizing composition | | |
|---|---|---|---|
|  | 0% | 2.5% | 4% |
| Tensile strength | 12.10 | 12.60 | 12.43 (kpsi) |
| Flexural strength | 18.93 | 19.38 | 19.58 (kpsi) |
| Notched IZOD | 2.41 | 2.60 | 2.54 (ft-lb/in) |
| Unnotched IZOD | 12.66 | 13.10 | 13.14 (ft-lb/in) |

The above data demonstrate the surprising effect of the presence of the aqueous dispersion of this invention in sizing composition on the mechanical properties of polypropylene composites reinforced by the sized glass fibers.

The foregoing has described aqueous dispersions of nucleating agents for use in glass fiber sizing composition. The use of the present invention in sizing composition results in glass fiber reinforced polyolefin composites having improved mechanical properties such as tensile strength, flexural strength, and notched and unnotched IZOD.

It should be understood that the embodiments of the present invention which have been described are merely illustrative of a few of the applications of the principles of this invention. Numerous modifications may be made by those skilled in the art without departing from the spirit and scope of the invention.

What is claimed is:

1. A storage stable aqueous dispersion comprising from about 15 to about 30 percent by weight of a normally solid nucleating agent, an effective amount of surfactant, up to about 10 percent by weight of base, and water.

2. The aqueous dispersion of claim 1 wherein the normally solid nucleating agent is a mixture of at least one aliphatic monocarboxylic acid having 8 to about 24 carbon atoms and at least one aliphatic dicarboxylic acid having 4 to about 21 carbon atoms in a weight ratio between about 1:4 and about 4:1.

3. The aqueous dispersion of claim 1 wherein the normally solid nucleating agent is a mixture of stearic acid and adipic acid.

4. The aqueous dispersion of claim 1 wherein the nucleating agent is a mixture of stearic acid and sebacic acid.

5. The aqueous dispersion of claim 1 wherein the nucleating agent is a mixture of behenic acid and dodecanedioic acid.

6. The aqueous dispersion of claim 1 wherein the surfactant represents from about 0.5 to about 15 percent by weight of the dispersion.

7. The aqueous dispersion of claim 1 wherein the surfactant is selected from the group consisting of ethoxylated alkyl phenols, ethoxylated alkyl alcohols, and ethoxylated fatty acids.

8. The aqueous dispersion of claim 7 wherein the ethoxylated alkyl phenols comprise ethoxylated nonylphenol having 2 to 12 ethylene oxide units.

9. The aqueous dispersion of claim 7 wherein the ethoxylated alkyl alcohols comprise ethoxylated lauryl alcohol having about 2 to about 12 ethylene oxide units.

10. The aqueous dispersion of claim 7 wherein the ethoxylated alkyl alcohol comprise ethoxylated decyl alcohol having about 2 to about 12 ethylene oxide units.

11. The aqueous dispersion of claim 7 wherein the ethoxylated alkyl alcohols comprise ethoxylated tridecyl alcohol having about 2 to about 12 ethylene oxide units.

12. The aqueous dispersion of claim 1 having pH in the range of about 5.0 to about 8.0.

13. A sizing composition comprising the aqueous dispersion of claim 1.

14. A composition comprising glass fibers coated with the sizing composition of claim 13.

15. A composite comprising polyolefin and the coated glass fibers of claim 14.

* * * * *